(12) United States Patent
Wilson et al.

(10) Patent No.: US 7,337,197 B2
(45) Date of Patent: Feb. 26, 2008

(54) DATA MIGRATION SYSTEM, METHOD AND PROGRAM PRODUCT

(75) Inventors: Forrest Lee Wilson, Miami, FL (US); Jason Joseph Blackburn, Twentynine Palms, CA (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 10/712,947

(22) Filed: Nov. 13, 2003

(65) Prior Publication Data

US 2005/0108304 A1 May 19, 2005

(51) Int. Cl.
*G06F 17/00* (2006.01)
(52) U.S. Cl. .......................... 707/204; 707/10; 707/200
(58) Field of Classification Search ................ 707/201, 707/10, 200, 204, 20; 711/100, 161, 162
See application file for complete search history.

(56) References Cited

U.S. PATENT DOCUMENTS

| 5,313,631 | A | | 5/1994 | Kao ........................... 395/600 |
| 5,930,806 | A | | 7/1999 | Taira et al. .................. 707/204 |
| 6,145,066 | A | * | 11/2000 | Atkin ........................... 711/165 |
| 6,161,109 | A | | 12/2000 | Matamoros et al. ......... 707/203 |
| 6,804,690 | B1 | * | 10/2004 | Dysert et al. ................ 707/204 |
| 7,093,088 | B1 | * | 8/2006 | Todd et al. .................. 711/162 |
| 2004/0064459 | A1 | * | 4/2004 | Pooni et al. ................. 707/100 |

OTHER PUBLICATIONS

"Logical volume management", available at http://en.wikipedia.org/wiki/Logical_volume_management, 2 pages printed.*
Vicom System, "SCSI-Fibre Channel Router", 2001, Vicom, Revision 2.1.0, pp. 1-42.*
Innovation Data Processing, "Innovation Data Processing", Jun. 11, 2002, http://web.archive.org/web/20020611230524/www.innovationdp.fdr.com/nve_02072002.cfm>, pp. 1-2.*
Naik, "Inside Windows Storage: Server Storage Technologies for Windows 2000, Windows Server 2003, and Beyond", Pub Date Jul. 15, 2003, pp. 1-25.*
"Data Migration Engine", Vicom Systems, www.vicom.com/products/dme.shtml, Nov. 5, 2003.
"Vicom Data Migration Engine", A White Paper from Vicom Systems, Inc., pp. 1-8.
"IBM Hardware-Assisted Data Migration Services", IBM, Oct. 2003, pp. 1-11.
"FDRPAS Explore the Astronomical Benefits" http://www.fdr.com/products/fdrpas/drpas04.cfm.

* cited by examiner

*Primary Examiner*—Hung Q Pham
(74) *Attorney, Agent, or Firm*—Kunzler & McKenzie

(57) ABSTRACT

A data migration method that reads data from a source volume on a source data storage device. The data is read as a bit image of a logical volume, cylinder by cylinder, track by track, and bit by bit. The data is moved on as an image of the logical volume, on a cylinder by cylinder, track by track, and bit by bit basis.

6 Claims, 5 Drawing Sheets

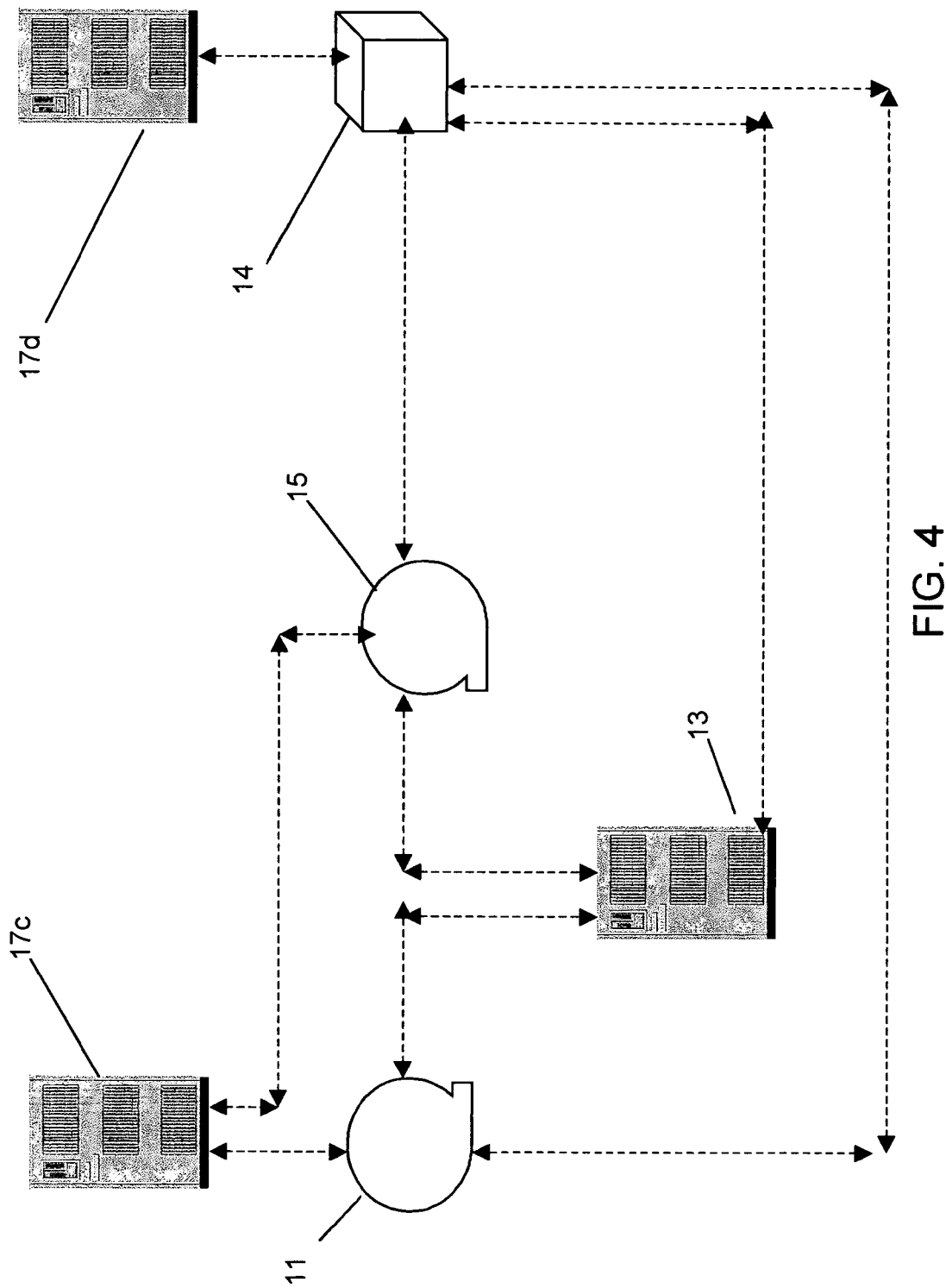

DATA MIGRATION SYSTEM, METHOD AND PROGRAM PRODUCT

BACKGROUND

1. Technical Field

Our invention relates to migration of database information and files from one or more data storage systems to another data storage system, including backing up database information and files on one or more storage systems, and file migration to and from high density nonvolatile storage, with immediate, delayed, and scheduled backup.

2. Description of Related Art

Data intensive enterprises frequently operate with many different, disparate and dissimilar storage platforms from many different vendors. There is a frequent need to migrate data between these dissimilar storage platforms. As used herein "data migration" is the movement of data from one or more storage systems, that is, source storage systems, to target storage systems. Data migration may be motivated by upgrading storage systems, consolidating storage systems and data, replacing existing storage systems, and load balancing.

The data migration process is typically complex and labor-intensive in today's business environment. This is because of the myriad of application servers, operating systems, file systems, volume management methodologies, physical devices, and networks. Information Technology departments face ever more challenges in migrating data. These challenges include the downtime involved in data migration, the frequent need to add data migration software to servers, the potential for data loss and corruption, the chance for error arising from heterogeneous environments, and simply the time involved.

Presently data is migrated between these different, disparate, and dissimilar platforms using host level mirroring with host based software. In the host based software approach with host level mirroring, the host software captures I/O operations before they leave the host and replicates them on the target storage device. But, installing host based software is itself inconvenient, requiring IPL's or reboots. Moreover, the host based software approach frequently requires additional software between the host operating system and the physical devices being migrated. Thus, host level mirroring with host based software is not a completely satisfying solution.

Another reason that host level mirroring is not altogether satisfactory is that many hosts do not supply the mirroring software, and therefore third party software solutions must be purchased. Typical third party solutions include Doubletake for Windows, HP Mirror, and Veritas for Sun. Data migration using third party software typically utilizes host level mirroring and is frequently labor intensive Given these obstacles, a clear need exists for a data migration system, method, and program product that is non-intrusive to the underlying business process, and relatively easy to implement.

SUMMARY

According to the method and system of our invention, it is possible to move data between disparate storage platforms, while avoiding host level mirroring. An embodiment of the present invention migrates computer data files as bit images of logical volumes between a source data storage device and a target data storage device. These data storage devices may be disparate and dissimilar devices.

An embodiment of the present invention requests data from a source volume as a bit image of the volume and writes the data to a target volume as a bit image. The data is requested and, optionally, read as a bit image of a logical volume, cylinder by cylinder, track by track, and bit by bit. The data is moved on as an image of the logical source volume, on a cylinder by cylinder, track by track, and bit by bit basis. According to an embodiment of the present invention, this data is then written to a target volume on the target data storage device as a bit image of a logical volume, on a cylinder by cylinder, track by track, and bit by bit basis.

The data is migrated as logical volumes in accordance with a map file having source and target volume parameters. Generally, the logical volume comprises a physical volume.

Using an embodiment of the present invention, a data migration hardware appliance, referred to herein as a data migration hardware engine, is connected between the existing storage devices, such as a host system and one or more target devices, data is transferred from source to target. The particular data transfer connection depends on the type of host server and storage device, (i.e., SCSI, SSA) open systems or mainframes.

The method, system, and program product described herein enable a user to access data from the source volume and move off of the source volume at substantially the same time.

BRIEF DESCRIPTION OF THE DRAWINGS

FIG. 3B shows the installation of a data migration engine to migrate data from the initial or source storage system to a target storage system. FIG. 3C shows the servers now using the target storage system after data migration.

FIG. 4 illustrates a data migration system for a mainframe computer system, with two mainframe computers, two data storage systems, a data migration engine, and fiber optic connector.

DETAILED DESCRIPTION

As described herein, data is moved between disparate storage platforms, while avoiding host level mirroring. An embodiment of the present invention migrates computer data files as cylinder-by-cylinder, track-by-track, bit-by-bit images ("bit images") between a source data storage device and a target data storage device. These data storage devices may be typically disparate and dissimilar devices.

Overall Sequence of Operation

For ease of explanation, but without any intended limitation, one aspect of the invention is described with reference to the flow chart illustrated in FIG. 1, and the system shown generally in FIG. 2.

The method and system of the invention migrates computer data files between a source data storage device and a target data storage device, where the computer data files are accessible to an end user from either data storage device. This is done without host level mirroring, requesting, and optionally reading, data from a source volume on the source data storage device, as a bit image of a logical volume; and writing the data to a target volume on the target data storage device, as a bit image of a logical volume.

Figure 1:
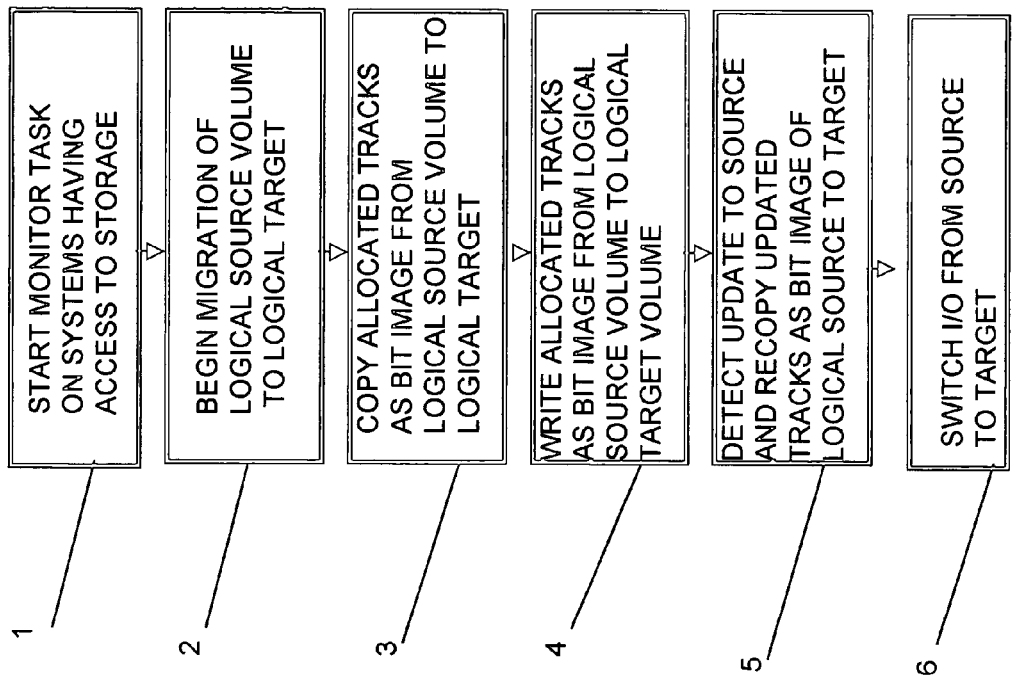
FIG. 1 is a flow chart of an embodiment of the invention for copying allocated tracks as a bit image from a logical source volume, and writing the bit image from the logical source volume to a logical target volume. The flow chart further shows that after migration is complete, I/O is switched from the source to the target.

FIG. 1 is an illustration of a flow chart of one embodiment of the invention. The illustrated embodiment starts data migration by starting a monitor task on systems, 17, having access to storage, block 1. Block 2 shows beginning the migration of the data in the source volume on the source storage, 11, to target storage, 15. The embodiment of the invention copies allocated tracks as bit images from the logical source volume, as shown in block 3. This embodiment writes the allocated tracks as a bit image from a logical source volume to a logical target volume, as shown in block 4. In one embodiment, illustrated in block 5 of the flow chart of FIG. 1, updates to the source are detected and the updated tracks containing updates to the source are recopied as a bit image from the logical source to the target. After migration is complete, I/O is switched from the source to the target.

This embodiment of the invention facilitates requesting, and optionally reading, data from a source volume and writing the data to a target volume. The data is read as a bit image of a logical volume, cylinder by cylinder, track by track, and bit by bit. The data is then moved on as an image of the logical source volume, on a cylinder by cylinder, track by track, and bit by bit basis, and written to a target volume on the target data storage device as a bit image of a logical volume, on a cylinder by cylinder, track by track, and bit by bit basis. The data is migrated as logical volumes in accordance with a map file having source and target volume parameters. Generally, the logical volume comprises a physical volume.

During the migration process, each source volume is mapped to a target LUN, (as used herein an "LUN" is a logical unit number on a SCSI bus that allows differentiation between and addressing to up to eight logical units) creating a synchronous mirror between each pair. All write commands go to both members, while completing a copy to the target volumes. As with any mirroring scenario, updates during the synchronization process are written to both sides of the mirror, allowing migration to continue with concurrent access from the applications. Once the data migration is complete, and the synchronous mirrors are in sync, a hard busy is placed on the source volumes and the SCSI TD from the source volumes are moved to the target volumes. This process allows the data migration with the computer data files being accessible to an end user during the data migration.

In this way a user accesses data from the source volume and moves off of the source volume at substantially the same time.

Hardware Components and Interconnections

The hardware embodiment of the invention includes a data migration engine, 13, connected between the existing or source data storage devices, the host system (server) and the new or target data storage devices. The type of connection depends on the type of host server and storage device, (i.e., FC, FCCAL, SCSI, SSA, ESCON, FICON), that is, open standards systems or mainframes.

Figure 2:
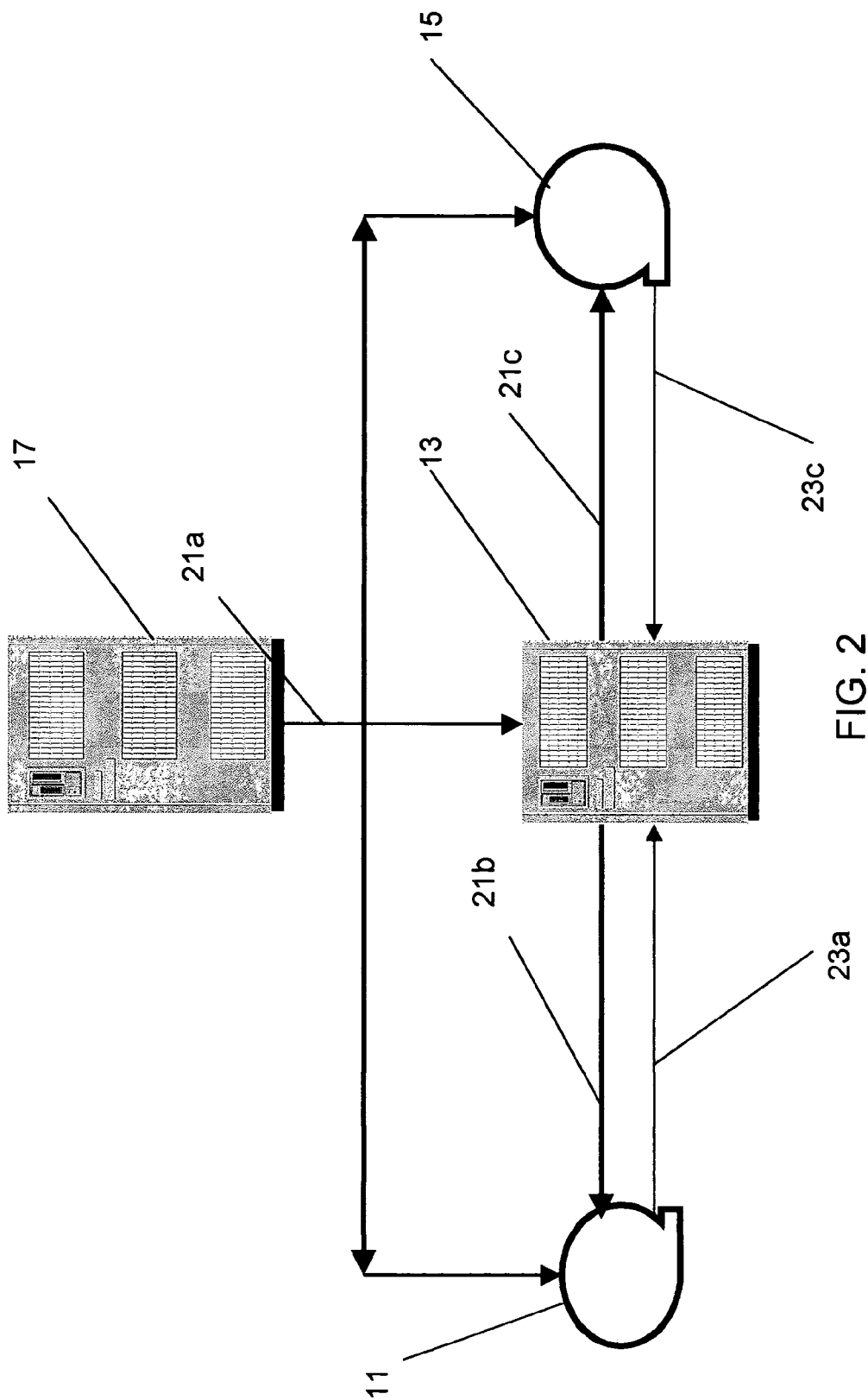
FIG. 2 is a high level schematic overview of a system configured to carry out an embodiment of the present invention. The FIG. shows a source platform, a data migration engine, and a target platform. Also shown are data updates, and data migration pathways, with one pathway from the source platform to the data migration engine and then from the data migration engine, to the target platform.

FIG. 2 is a high level view of a simplified system, while FIG. 3 is a schematic view of an open standards system, and FIG. 4 is a schematic view of a mainframe system, In all of these systems a data migration engine (also referred to herein as a data migration engine, a data migration appliance, and a data migration hardware appliance).

The embodiment of the present invention, illustrated in FIG. 2, requests, and optionally reads, data from a source volume on a source data storage device, 11. The data is obtained as a bit image of a logical volume, cylinder by cylinder, track by track, and bit by bit. The data is moved to a data migration engine, 13, such as an Innovation Data Processing, Inc. FDRPAS (FDR Plug and Swap) tool in a mainframe system or a Vicom System DME Data Migration Engine for open systems. The image is migrated as an image of the logical volume, on a cylinder by cylinder, track by track, and bit by bit basis, and from the data migration engine, 13, to a data target, 15, also, as an image of the logical volume on the source platform, 11, on a cylinder by cylinder, track by track, and bit by bit basis.

According to an embodiment of the present invention, this data is written to a target volume on the target data storage device, 15, as a bit image of a logical volume, on a cylinder by cylinder, track by track, and bit by bit basis.

The data is migrated as individual logical volumes in accordance with a map file having source and target volume parameters. Generally, the logical volume comprises a physical volume.

Also shown are data updates, 21a, 21b, and 21c, and data migration pathways, with one pathway, 23a, from the source platform, 11, to the data migration engine, 13, and then from the data migration engine, 13, to the target platform, 15, along migration path 23b.

Using an embodiment of the present invention, it is possible to receive updates during migration and maintain two synchronous copies of the data. Once the required logical volumes are synchronized, primary access to the data can be placed on the target volumes. This involves receiving updates during migration, and then placing a "busy" (e.g., a "hard busy") condition on the source volume after data migration, and setting a SCSI ID to identify the target volume for access. This process is repeated, for example, on a logical volume by logical volume basis. In this way a user accesses data from the source volume and moves off of the source volume at substantially the same time.

As used in the method and system of our invention, the data migration engine, 13, reads every track, every cylinder, and every bit, from the source platform, 11, and writes this information to the target platform, 15. The data being migrated is a bit copy, that is, a bit-by-bit, track-by-track, cylinder-by-cylinder image, of the original, source volume on the source platform, 11. Zeros and ones are moved from a source platform, 11, to a target platform, 15. For this reason, an embodiment of the present invention can migrate image databases, such as Oracle, IBM DB2, and Microsoft SQL7, without concern for data corruption or missing data.

Open Standards Systems

Figure 3C:
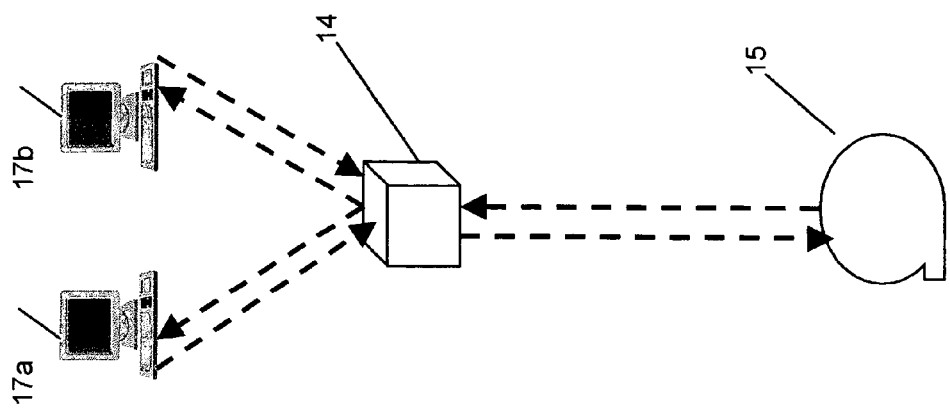
FIGS. 3A, 3B, and 3C, illustrate a data migration sequence where servers are initially utilizing a first data storage platform to store data.
Figure 3B:
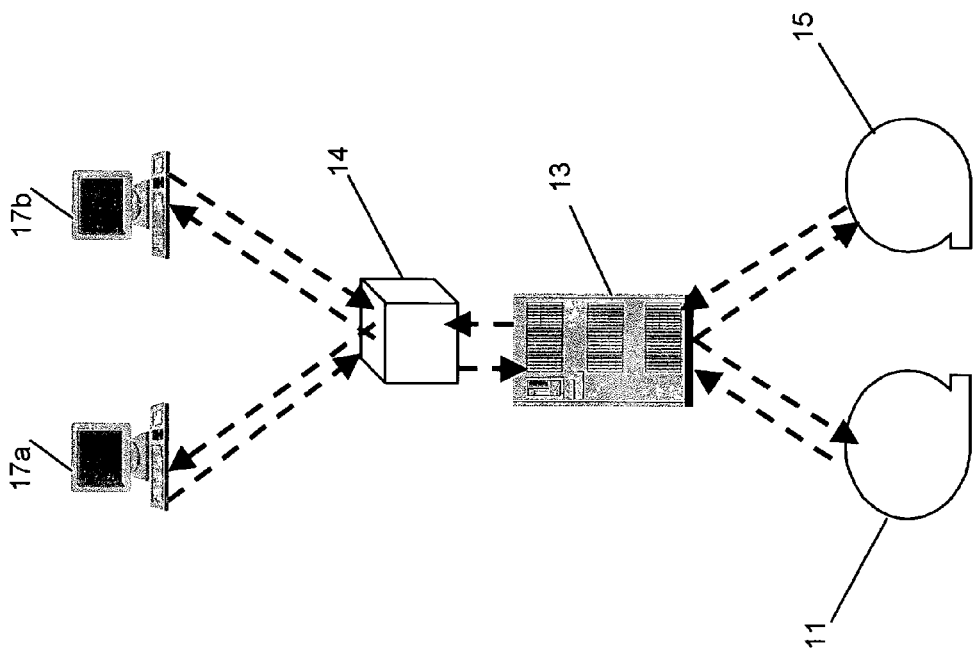
Figure 3A:
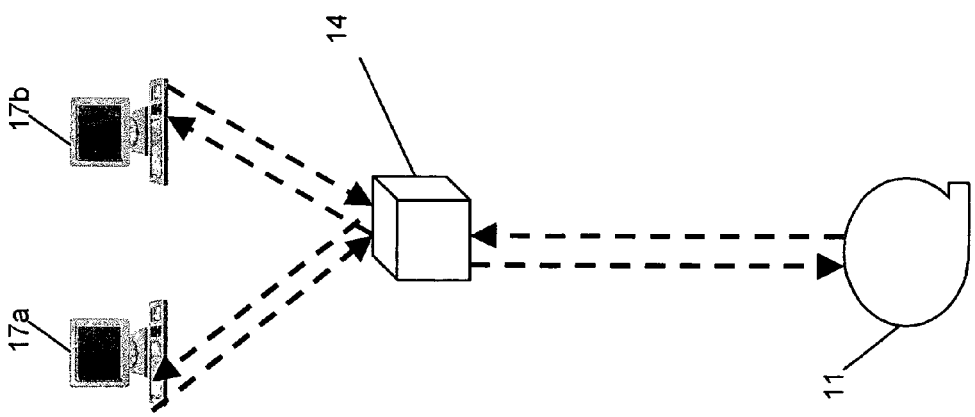

FIGS. 3a, 3b, and 3C illustrate open standards systems in a data migration sequence. The FIGS. illustrates open standards servers 17a and 17b. These servers may be Windows, Unix, Linux, or MacOS servers. The servers, 17a and 17b, are connected to optical connectors, 14, exemplified by Fibre Channel connectors. Fibre Channel is an optical channel for Gbps level data transmission between servers and, for example, shared storage devices, and for interconnecting storage devices and drivers.

In FIG. 3a, the servers, 17a and 17b are connected directly to the data storage system 11. In FIG. 3b data migration is started from a source data storage system, 11 to a target data system, through a data migration system, 13, as will be discussed below. After data migration is completed, the servers, 17a and 17b, are disconnected from the source data storage system, and the data migration engine, 13, is removed from the system; the servers are connected through the Fibre Channel connector, 14, to the data storage system, 15.

For open systems, the data migration engine, 13, may be, strictly by way of illustration and not limitation, a Vicom Systems DME data migration engine. The Vicom DME data migration engine is an in-band appliance that provides block level migration between a source and a target storage device. The Vicom DME data migration engine maps each source volume to a target LUN. This tool transparently moves active volumes from old devices to new devices. Typically, the data migration engine is used in an environment that supports dynamic plug in and nondisruptive activation of new disk hardware.

For open systems, the Vicom DME data migration engine serially or concurrently swaps source devices SCSI ID's to the target devices while maintaining the individual source platform product data. This allows active open systems to continue to utilize existing drivers and, even, vendor specific software, while communicating with the target devices as if they are the original source devices.

The data migration engine, 13, is connected between the source platform, 11, and the target platform, 15. This connection can be a point to point configuration, an arbitrated loop configuration, or a SCSI configuration. The data migration engine, 13, is a pass-through between the source platform, 11, and the target platform, 15, and allows all updates to go to both the source platform, 11, and the target platform, 15. Both the source platform, 11, and the target platform, 15, receive updates through the data migration engine, 13.

The data migration engine, configured and controlled to read source data as an image of the logical volume, on a cylinder by cylinder, track by track, and bit by bit basis, and transfer it to the target platform, 15, starts reading source data from, for example, cylinder "0" and track "0", copying the data from the beginning of the source volume to the end of the source volume on a physical volume level.

After the migration or copy has been successfully completed, the data migration engine, 13, puts a "busy" (e.g., a "hard busy") condition on the source volume and switches the SCSI ID so that the target volume is the only volume online for the customer to use. This process is continued until all of the source volumes have been copied and switched to the target platform, 15.

For open systems utilizing, for example, it is not always necessary for the data migration engine, 13, to put a "busy" (e.g., a "hard busy") condition on the source volume and switch the SCSI ID so that the target volume is the only volume online for the customer to use. This is because, in the case of data migration engines for use with open systems, the tool, e.g., a Vicom DME, has the ability to maintain the source and target devices until such time as the host I/O for that particular open system can be stopped allowing for the source and target to be exact duplicates of each other and maintain two copies of the data.

Mainframe Systems

The data migration engine, 13, may be, strictly by way of illustration and not limitation, an Innovation Data Processing, Inc. FDRPAS (FDR Plug and Swap) data migration engine for mainframe systems. This engine transparently moves active volumes from old devices to new devices. Typically, the data migration engine is used in an environment that supports dynamic plug in and nondisruptive activation of new disk hardware. By way of illustration for mainframe, IBM z/OS system services in conjunction with FDRPAS, facilitates serially or concurrently swapping multiple shared disk volumes, in multiple systems.

Data migration can be carried while the end user is accessing old storage and also moving of the old storage at the same time. The data migration can be fully automated from a map file which has the source volume and the target volume in the map file. The map file is based on machine identifiers, as serial numbers.

The Innovation Data Processing, Inc. FDRPAS (FDR Plug and Swap) data migration engine for mainframe systems begins migration by a job request or console command. The command requests that an online disk storage device, the source device, 11, be migrated to an off line disk storage device, the target device, 15. The migration can be initiated on any server, 17c, in a complex, and other servers, 17d, will join in. The migration tool, 13, will assure that the target device, 15, is off line to all servers, 17c, and 17d, and can not be accidentally overlaid during data migration.

A fiber optic connector, 14, such as an IBM dynamically modifiable fiber optic interconnect, connects the For all requested volumes, the Innovation Data Processing, Inc. FDRPAS (FDR Plug and Swap) data migration engine, 13, will copy all allocated tracks on the source volume, 11, to the target device, 15, while simultaneously detecting all updates to the source device, 11. This allows updated tracks to be migrated. Using the Innovation Data Processing, Inc. FDRPAS (FDR Plug and Swap) data migration engine, 13, the target device remains offline during the data migration.

Once data migration is completed, the Innovation Data Processing, Inc. FDRPAS (FDR Plug and Swap) data migration engine, 13, swaps the data storage devices, that is, it swaps the source and target data storage devices, 11 and 15.

Signal Bearing Media and Associated Program Product

The invention may be implemented, for example, by having the data migration engine or tool, 13, under the control of one of more of the servers, 17 in FIG. 2, 17a or 17b in FIG. 3, or 17c or 17d in FIG. 4, execute a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for migrating data from one storage medium to another storage medium by reading data from a source volume on a source data storage device, as a bit image of a logical volume; and writing the data to a target volume on a target data storage device as a bit image of a logical volume.

Figure 5:
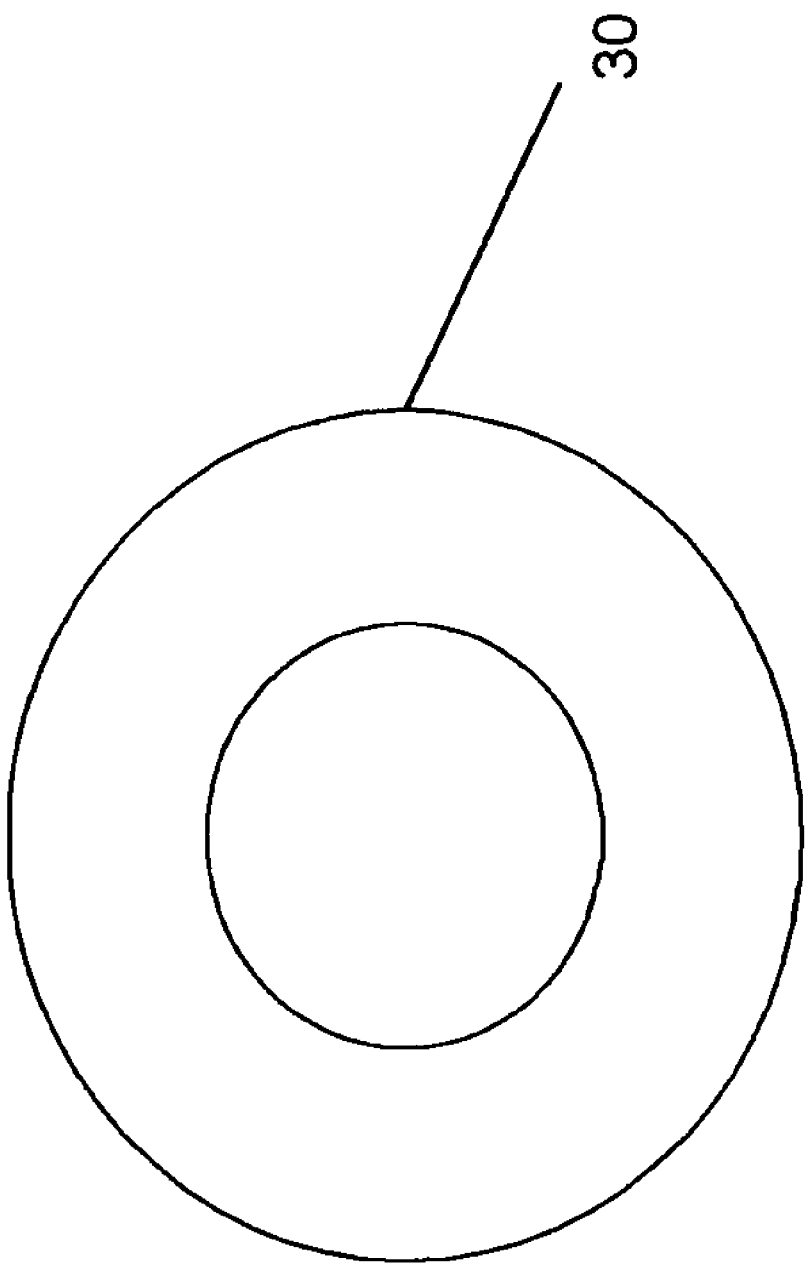
FIG. 5 illustrates an example of a signal-bearing medium carrying a program product to configure and control a system in accordance with an embodiment of the invention.

This signal-bearing medium may comprise, for example, memory in the servers, such as the illustrated 17 in FIG. 2, 17a or 17b in FIG. 3, or 17c or 17d in FIG. 4. The memory in the server may be non-volatile storage, a data disc, or even memory on a vendor server for downloading to one of the servers, 17 in FIG. 2, 17a or 17b in FIG. 3, or 17c or 17d in FIG. 4, for installation. Alternatively, the instructions may be embodied in a signal-bearing medium such as the optical data storage disc 30 shown in FIG. 5. The optical disc can be any type of signal bearing disc or disk, for example, a CD-ROM, CD-R, CD-RW, WORM, DVD-R, DVD+R, DVD-RW, or DVD+RW. Additionally, whether contained in a cluster with the server, 17, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

While our invention has been described with respect to certain preferred embodiments and exemplifications, it is not intended to limit the scope of the invention thereby, but solely by the claims appended hereto.

We claim:

1. A computer system for migrating data comprising;
   a server interfacing with a plurality of data storage devices, said server configured to migrate computer data files from one of said data storage device as a source to a second data storage device as a target by:
   requesting data from a source volume on the source data storage device, in accordance with a map file having source and target volume parameters, as a bit image of a logical volume, cylinder by cylinder, track by track, and bit by bit, wherein the source volume is mapped to a target logical unit number (LUN) on a small computer system interface (SCSI) bus;
   outputting the requested data to a target volumne, wherein all write commands go to the source volume and the target volume during outputting the requested data, and writing the requested data on the target data storage device as a bit image of the logical volume, cylinder by cylinder, track by track, and bit by bit, wherein updates to the source are detected and updated tracks containing said updates are recopied as a bit image form the source to the target;
   placing a busy condition on the source volume after outputting data;
   setting a SCSI ID to identify the target volume for access; and
   repeating requesting data and outputting data on a logical volume by logical volume basis, whereby a user accesses data from the source volume and moves off of the source volume at the same time.

2. The computer system of claim 1 wherein the logical volume comprises a physical volume.

3. A method of migrating computer data files between a source data storage device and a target data storage device comprising:
   requesting data from a source volume on the source data storage device, in accordance with a map file having source and target volume parameters, as a bit image of a logical volume, cylinder by cylinder, track by track, and bit by bit, wherein the source volume is mapped to a target logical unit number (LUN) on a small computer system interface (SCSI) bus;
   outputting the requested data to a target volume, wherein all write commands go to the source volume and the target volume during outputting the requested data, and writing the requested data on the target data storage device as a bit image of the logical volume, cylinder by cylinder, track by track, and bit by bit, wherein updates to the source are detected and updated tracks containing said updates are recopied as a bit image from the source to the target;
   placing a busy condition on the source volume after outputting data;
   setting a SCSI ID to identify the target volume for access; and
   repeating requesting data and outputting data on a logical volume by logical volume basis, whereby a user accesses data from the source volume and moves off of the source volume at the same time.

4. The method of claim 3 wherein the logical volume comprises a physical volume.

5. A data processing system program product having executable instruction code stored on a machine-readable data storage medium for migrating data, wherein the executable instruction code when executed on a data processing system causes the data processing system to perform:
   request data from a source volume on a source data storage device, in accordance with a map file having source and target volume parameters, as a bit image of a logical volume, cylinder by cylinder, track by track, and bit by bit, wherein the source volume is mapped to a target logical unit number (LUN) on a small computer system interface (SCSI) bus;
   output the requested data to a target volume of a target data storage device, wherein all write commands go to the source volume and the target volume during outputting the requested data, and writing the requested data on the target data storage device as a bit image of the logical volume, cylinder by cylinder, track by track, and bit by bit, wherein updates to the source are detected and updated tracks containing said updates are recopied as a bit image from the source to the target;
   placing a busy condition on the source volume after outputting data;
   setting a SCSI ID to identify the target volume for access, and
   repeating requesting data and outputting data on a logical volume by logical volume basis, whereby a user accesses data from the source volume and moves off of the source volume at the same time.

6. The data processing system program product of claim 5 wherein the logical volume comprises a physical volume.

* * * * *